US008433943B2

(12) United States Patent
Lin et al.

(10) Patent No.: US 8,433,943 B2
(45) Date of Patent: Apr. 30, 2013

(54) POWER-SUPPLY EXPANSION SYSTEM AND METHOD THEREOF

(75) Inventors: Chang-Pan Lin, Taipei County (TW); Shih-Chun Chang, Taipei County (TW)

(73) Assignee: Elitegroup Computer Systems Co., Ltd., Taipei (TW)

( * ) Notice: Subject to any disclaimer, the term of this patent is extended or adjusted under 35 U.S.C. 154(b) by 361 days.

(21) Appl. No.: 12/826,718

(22) Filed: Jun. 30, 2010

(65) Prior Publication Data

US 2011/0055614 A1   Mar. 3, 2011

(30) Foreign Application Priority Data

Aug. 25, 2009   (TW) ................................ 98128581 A

(51) Int. Cl.
*G06F 1/00* (2006.01)
(52) U.S. Cl.
USPC .......................................... 713/340; 713/300
(58) Field of Classification Search ........... 713/300–340
See application file for complete search history.

(56) References Cited

U.S. PATENT DOCUMENTS

| | | | | |
|---|---|---|---|---|
| 5,852,550 A | * | 12/1998 | Majid et al. ................. | 363/21.05 |
| 2001/0003205 A1 | * | 6/2001 | Gilbert .......................... | 713/320 |
| 2003/0048645 A1 | * | 3/2003 | Hosotani et al. ............ | 363/21.12 |
| 2005/0127758 A1 | * | 6/2005 | Atkinson et al. ................ | 307/80 |
| 2008/0048613 A1 | * | 2/2008 | Baron et al. .................... | 320/114 |
| 2009/0217059 A1 | * | 8/2009 | Gervais et al. ................ | 713/300 |
| 2010/0301673 A1 | * | 12/2010 | Riedel et al. ..................... | 307/66 |

FOREIGN PATENT DOCUMENTS

CN   2909368 Y   6/2007

* cited by examiner

*Primary Examiner* — Kim Huynh
*Assistant Examiner* — Alyaa Mazyad
(74) *Attorney, Agent, or Firm* — WPAT, P.C.; Anthony King

(57) ABSTRACT

A power-supply expansion system includes a primary power-supply unit for providing a main power supply, a secondary power-supply unit for providing an auxiliary power supply, a power unit having a first and a second input terminal and an output terminal, and a control unit connected to the primary and the secondary power-supply unit. The control unit, based on a load value of the primary power-supply unit, selectively performs a power-supply expansion process for the secondary power-supply unit to feed the auxiliary power supply to the second input terminal. In the power-supply expansion process, the first input terminal receives the main power supply and the second input terminal receives the auxiliary power supply, and the power unit integrates the main and the auxiliary power supply into an output power supply, which is output via the output terminal. A power-supply expansion method applicable to the power-supply expansion system is also disclosed.

13 Claims, 4 Drawing Sheets

POWER-SUPPLY EXPANSION SYSTEM AND METHOD THEREOF

FIELD OF THE INVENTION

The present invention relates to a power-supply expansion system and method thereof; and more particularly, to a power-supply expansion system and a method capable of providing a main and an auxiliary power supply at the same time.

BACKGROUND OF THE INVENTION

Since most of the conventional power supply systems are designed according to the designed specifications of the load terminal, the output power that can be provided by a power supply system is a preset value. The output power must be so set that electric power sufficient for the load terminal to work normally, i.e. the maximum power consumption at the load terminal, can be provided in any condition. And, when viewing from the aspect of practical application, a load terminal of a computer system or an electronic device, such as the central processing unit (CPU), the random access memory (RAM), the display, etc., would not always in a full-load state.

Among others, the electronic devices for mobile communication are generally in a standby or power-saving mode in most time. Therefore, in practical application, it is very important for the power supply system to well match the power level needed by the load terminal.

In a conventional notebook computer, the power supply system thereof uses a rectifier transformer to convert alternating current (AC) into direct current (DC), which is then directly sent to the computer system of the notebook computer. Part of the DC power received by the computer system is used to charge the battery in the notebook computer. When the transformer loses its AC power supply, the battery can provide the power needed by the computer system to work normally.

However, the conventional power supply systems can use only one of the transformer and the battery to supply the power each time. That is, the conventional power supply systems are not designed to allow the transformer and the battery to supply power to a computer system or an electronic device at the same time. Thus, the electric power usable by the computer system or the electronic device is restricted to the specifications set for the transformer and the battery. Electric power exceeding the specifications set for the transformer and the battery is not usable by the computer system or electronic device.

SUMMARY OF THE INVENTION

It is therefore a primary object of the present invention to provide a power-supply expansion system, so as to solve the problems in the prior art that electric power can only be supplied from one single type of power supply without the possibility of using multiple sets of power supply to provide electric power to a computer system or an electronic device at the same time; and that the usable electric power is restricted to the specifications set for a transformer or a battery without the possibility of using electric power exceeding the specifications of the transformer or the battery.

To achieve the above and other objects, the power-supply expansion system provided according to the present invention includes a primary power-supply unit, a secondary power-supply unit, a power unit, and a control unit. The primary power-supply unit provides a main power supply. The secondary power-supply unit provides an auxiliary power supply. The power unit has a first input terminal, a second input terminal, and an output terminal. The first input terminal receives the main power supply or the auxiliary power supply; and the second input terminal receives the auxiliary power supply. The control unit is connected to the primary power-supply unit and the secondary power-supply unit, and selectively performs a power-supply expansion process based on a load value of the primary power-supply unit, so that the secondary power-supply unit can feed the auxiliary power supply to the second input terminal. The power unit is able to integrate the main power supply received by the first input terminal and the auxiliary power supply received by the second input terminal into an output power supply for outputting via the output terminal.

The power-supply expansion system of the present invention further includes a first switch, a second switch, and an overcurrent protection unit. The overcurrent protection unit is electrically connected to the secondary power-supply unit for limiting the auxiliary power supply provided by the secondary power-supply unit to a value lower than a nominal current value. The first switch is located between the overcurrent protection unit and the first input terminal, and is selectively turned on or cut off according to a switch control signal output by the control unit. The second switch is located between the overcurrent protection unit and the second input terminal, and is selectively turned on or cut off according to the switch control signal output by the control unit.

Moreover, the power-supply expansion system of the present invention can include a load sensing unit electrically connected to the primary power-supply unit for sensing a load value of the primary power-supply unit.

In addition, the power-supply expansion system of the present invention can further include a charging control unit electrically connected to between the primary power-supply unit, the secondary power-supply unit, and the control unit. The charging control unit can perform a charging process to charge the secondary power-supply unit under control of the control unit or according to the determination of the charging control unit.

Another object of the present invention is to provide a power-supply expansion method, which is applicable to the above-described power-supply expansion system. According to the power-supply expansion method of the present invention, in a first step, the control unit observes at least one load value fed back by a plurality of monitoring points and determines whether to control the primary power-supply unit and the secondary power-supply unit to simultaneously provide the main power supply and the auxiliary power supply, respectively, to the first input terminal and the second input terminal, respectively. Then, if it is determined as yes in the above step, a power-supply expansion process is performed, so that the main power supply is fed to the first input terminal and the auxiliary power supply is fed to the second input terminal. Finally, the main power supply and the auxiliary power supply are integrated into an output power supply for outputting to the output terminal.

In the power-supply expansion method of the present invention, when the load value reaches a first preset value, which is 90% of a maximum power supply capacity of the primary power-supply unit, or in other words, when the power consumption at a load terminal is about to exceed the maximum power supply capacity of the primary power-supply unit, the control unit cuts off the first switch and turns on the second switch to perform the power-supply expansion process.

The control unit can further verify whether the secondary power-supply unit has an available power supply capacity larger than a preset available power supply capacity before performing the power-supply expansion process. The preset available power supply capacity is 20% of a maximum power supply capacity of the secondary power-supply unit.

When the power-supply expansion process continues and brings the available power supply capacity of the secondary power-supply unit to become smaller than the preset available power supply capacity, such as becomes smaller than 20% of the maximum power supply capacity of the secondary power-supply unit, the control unit cuts off the second switch and turns on the first switch in order to stop performing the power-supply expansion process.

Under the above condition, the control unit can further generate a first command signal to command a central processing unit of a computer system or an electronic device at the load terminal to execute frequency reduction and thereby reduce the power needed by the computer system or the electronic device, so that power to be consumed by the load terminal can be supplied thereto. And, no request for actuating the power-supply expansion process will be accepted before the preset available power supply capacity reaches 20% of the maximum power supply capacity of the secondary power-supply unit, so as to provide stable power supply.

In the power-supply expansion method of the present invention, when the load value has become smaller than a second preset value for a preset time-duration, and the second preset value is 50% of the maximum power supply capacity of the primary power-supply unit, it means the power consumption at the load terminal is maintained at a middle power value and there is no need to perform the power-supply expansion process in terms of a system overall power supply distribution. Thus, the control unit cuts off the second switch, turns on the first switch, and stops performing the power-supply expansion process.

In the power-supply expansion method of the present invention, when the load value has become smaller than a third preset value for a preset time-duration, and the third preset value can be ranged between 20% and 50% of the maximum power supply capacity of the primary power-supply unit, it also means the power consumption at the load terminal is maintained at a power value slightly lower than a middle power value. Since the load terminal can maintain normal operation without the need of performing a power-supply expansion process, and the main power supply available from the primary power-supply unit exceeds the power supply needed by the load terminal, the control unit can generate a second command signal to command the charging control unit to charge the secondary power-supply unit.

Further, according to the power-supply expansion method of the present invention, when the load value is smaller than a fourth preset value, which is set to be 3% of the maximum power supply capacity of the primary power-supply unit, the control unit controls the first switch and the second switch, so that the second switch is cut off and the first switch is turned on to stop performing the power-supply expansion process. Meanwhile, the secondary power-supply unit is brought to provide the auxiliary power supply via the first switch to the first input terminal. In this manner, the auxiliary power supply provided by the secondary power-supply unit can be supplied to the load terminal in the event the primary power-supply unit fails to supply power due to some unexpected external factors.

In brief, the power-supply expansion system and method according to the present invention has the following advantages:

(1) With the system and method of the present invention, main and auxiliary power supply can be provided at the same time, so that the electric power needed by computer systems or electronic devices is not necessarily restricted to the main power supply or the auxiliary power supply, (2) With the system and method of the present invention, when the battery for providing the auxiliary power supply is not in a charging state, the battery can be used to supply electric power to computer systems or electronic devices.

(3) With the system and method of the present invention, the secondary power-supply unit can be charged when the computer systems or electronic devices are in a low-load state, so that the electric power can be effectively utilized.

(4) With the system and method of the present invention, computer systems or electronic devices can automatically decide the size of power to be supplied thereto without being limited to the specification of the main power supply or the auxiliary power supply.

(5) With the system and method of the present invention, an overcurrent protection mechanism is provided to limit the discharge current supplied by the auxiliary power supply, so as to avoid any danger caused by an instantaneous overlarge load of the computer system or electronic device.

(6) The system and method of the present invention is applicable to either one single or a plurality of computer systems or electronic devices, and is therefore highly flexible in terms of its application.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
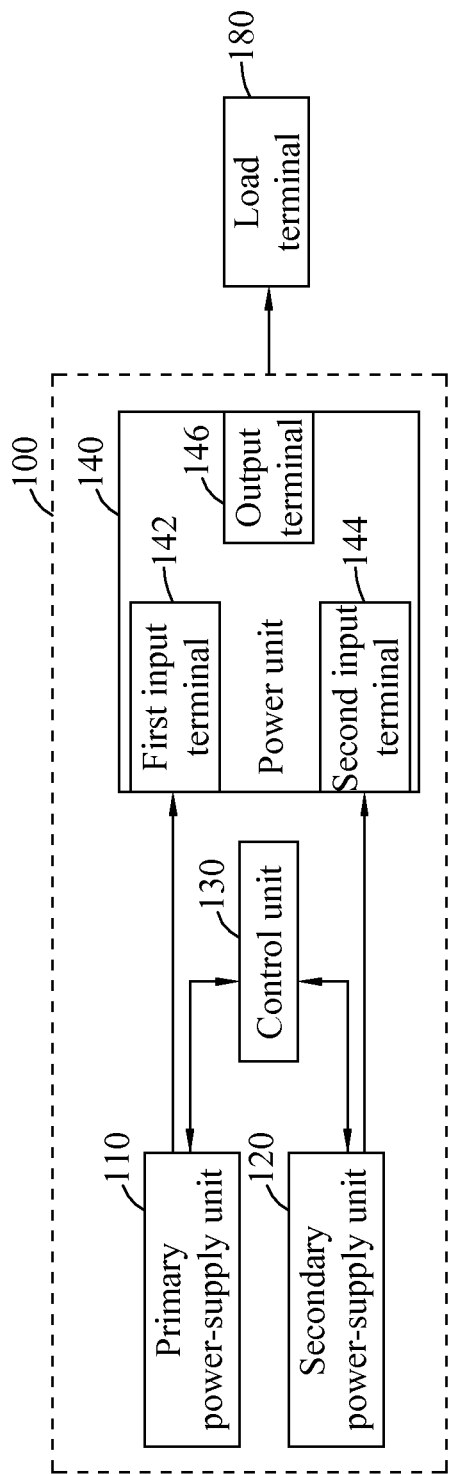
FIG. 1 is a block diagram of a power-supply expansion system according to the present invention.

Please refer to FIG. 1 that is a block diagram of a power-supply expansion system 100 according to the present invention. As shown, the power-supply expansion system 100 includes a primary power-supply unit 110, a secondary power-supply unit 120, a control unit 130, and a power unit 140. The primary power-supply unit 110 is used to provide a main power supply, and the secondary power-supply unit 120 is used to provide an auxiliary power supply. The power unit 140 has a first input terminal 142, a second input terminal 144, and an output terminal 146. The control unit 130 is connected to the primary power-supply unit 110 and the secondary power-supply unit 120; and is able to selectively perform a power-supply expansion process according to a load value of the primary power-supply unit 110, so that the secondary power-supply unit 120 feeds the auxiliary power supply to the second input 144.

In performing the power-supply expansion process, the first input terminal 142 receives the main power supply from the primary power-supply unit 110, and the second input terminal 144 receives the auxiliary power supply from the secondary power-supply unit 120. At this point, the power unit 140 integrates the main power supply and the auxiliary power supply into an output power supply, which is output via the output terminal 146 to a load terminal 180. The load terminal 180 may include one single or a plurality of computer systems or electronic devices. In the illustrated embodiment, the power unit 140 has two input terminals and one output terminal. However, it is understood the number of the input terminals and of the output terminals are not necessarily limited to two and one, respectively, but can be changed according to actual need.

Figure 2:
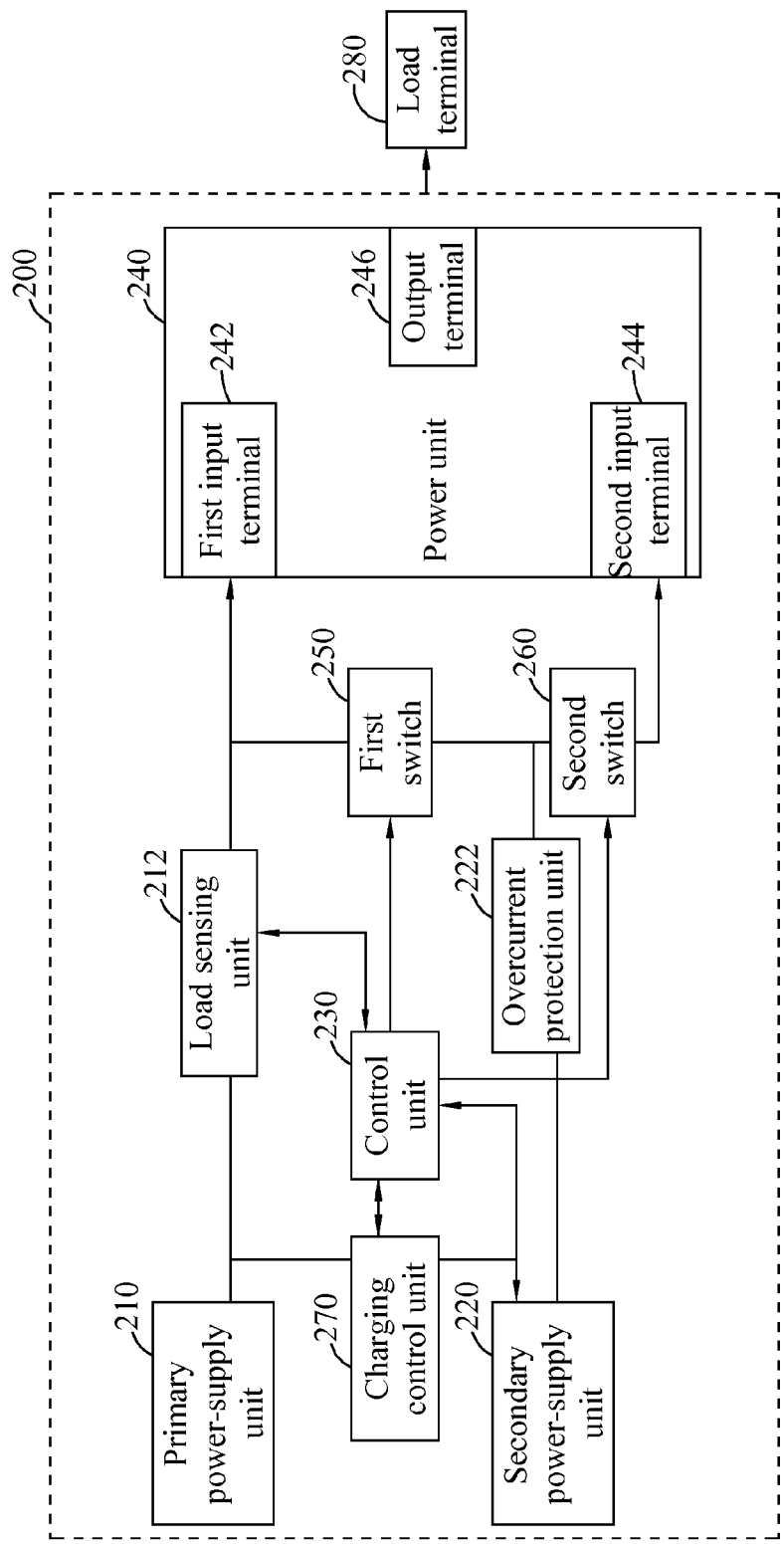
FIG. 2 is another block diagram of the power-supply expansion system according to the present invention.

FIG. 2 is another block diagram of a power-supply expansion system 200 according to the present invention. As shown, the power-supply expansion system 200 includes a primary power-supply unit 210, a secondary power-supply unit 220, a control unit 230, and a power unit 240. The power unit 240 has a first input terminal 242, a second input terminal 244, and an output terminal 246. Since the primary power-supply 210, the secondary power-supply unit 220, the control unit 230 and the power unit 240 are connected to one another in a manner similar to that in the first embodiment as shown in FIG. 1, they are not repeatedly described in details herein. However, structural differences between the first and the second embodiment of the power-supply expansion system of the present invention will still be described hereinafter.

The power-supply expansion system 200 further includes a first switch 250, a second switch 260, and an overcurrent protection unit 222. The first switch 250 and the second switch 260 can be implemented as, for example, metal-oxide-semiconductor field-effect transistors (MOSFETs) without being limited thereto. The first switch 250 is provided between the overcurrent protection unit 222 and the first input terminal 242, and is selectively turned on or cut off according to a switch control signal output by the control unit 230. The second switch 260 is provided between the overcurrent protection unit 222 and the second input terminal 244, and is selectively turned on or cut off according to the switch control signal output by the control unit 230.

The overcurrent protection unit 222 further included in the power-supply expansion system 200 is electrically connected to the secondary power-supply unit 220 for limiting a discharge current from the secondary power-supply unit 220 to a value not exceeding a nominal current value, in order to avoid any damage to any computer system or electronic device caused by an instantaneous overlarge load thereof. For instance, when the discharge current from the secondary power-supply unit 220 is about to exceed a nominal current value, the overcurrent protection unit 222 can increase a resistance thereof to stop the secondary power-supply unit 220 from providing the auxiliary power supply and thereby achieves the purpose of limiting the discharge current from the secondary power-supply unit 220 in a manner similar to cutting off a switch.

The power-supply expansion system 200 further includes a load sensing unit 212, which is electrically connected to the primary power-supply unit 210 for sensing a load value of the primary power-supply unit 210. When the load sensing unit 212 sends a detected load value to the control unit 230 and the detected load value is larger than a first preset value, the first switch 250 is cut off and the second switch 260 is turned on to perform a power-supply expansion process. In the illustrated embodiment of the power-supply expansion system 200 of the present invention, the first preset value is 90% of a maximum power supply capacity of the primary power-supply unit 210.

The control unit 230 can further check for an available power supply capacity of the secondary power-supply unit 220. The power-supply expansion process would be performed only when the load value is larger than the first preset value and the available power supply capacity of the secondary power-supply unit 220 is larger than a preset available power supply capacity. The preset available power supply capacity is 20% of a maximum power supply capacity of the secondary power-supply unit 220.

Moreover, the control unit 230 is able to cut off the second switch 260 and turn on the first switch 250 when the available power supply capacity of the secondary power-supply unit 220 is smaller than the preset available power supply capacity, so as to stop performing the power-supply expansion process. Further, the control unit 230 is able to generate a first command signal when the available power supply capacity is smaller than the preset available power supply capacity. The first command signal is generated for commanding a central processing unit of a computer system or an electronic device to execute frequency reduction. More specifically, the first command signal can order a central processing unit at a load terminal 280 to enter into a low power consumption state under a silent mode. In the silent mode, the central processing unit can stably operate at low voltage, low clock pulse, and low noise. Through the frequency reduction or voltage reduction executed by a central processing unit thereof, the computer system or the electronic device at the load terminal 280 can have a reduced overall load.

Further, when the load value has become smaller than a second preset value for a preset time-duration, such as from 1 to 2 seconds, the control unit 230 is able to cut off the second switch 260 and turn on the first switch 250, so as to stop performing the power-supply expansion process. The second preset value can be, for example, 70% of the maximum power supply capacity of the primary power-supply unit 210. The reason to preset the time-duration is to avoid problems possibly caused by any false action due to instantaneously increased or highly unstable power consumption at the load terminal 280. The preset time-duration of 1~2 seconds can be changed or adjusted in response to actual circuit design and the specifications of the electronic device being used.

Further, when the load value has become smaller than a third preset value for a preset time-duration, such as from 1 to 2 seconds, the control unit 230 is able to generate a second command signal for commanding a charging control unit 270 of the power-supply expansion system 200 to perform a charging process. Here, the third preset value is, for example, ranged between 20% and 50% of the maximum power supply capacity of the primary power-supply unit 210.

Furthermore, when the load value is smaller than a fourth preset value, the control unit 230 is able to cut off the second switch 260 and turn on the first switch 250, so as to stop performing the power-supply expansion process. Meanwhile, the required power supply is provided by the secondary power-supply unit 220. Here, the fourth preset value is, for example, 3% of the maximum power supply capacity of the primary power-supply unit 210. In this way, it is able to solve the problems that would occur due to a suddenly removed primary power-supply unit 210, such as an instantaneous shutdown of the computer system or electronic device that would prevent a document file under editing from being saved or prevent the system or device from operating normally.

In conclusion, the control unit 230 in the present invention compares the load value with different preset values and determines according to comparison results whether it is necessary to perform a power-supply expansion process. That is, the preset values are set for determining whether to actuate the performing of a power-supply expansion process. In the illustrated embodiment of the power-supply expansion system 200, the primary power-supply unit 210 provides the main power supply, and the first preset value is set to be 90% of the maximum power supply capacity of the main power supply, the second preset value is set to be 70% of the maximum power supply capacity of the main power supply, the third preset value is set to range between 20% and 50% of the maximum power supply capacity of the main power supply, and the fourth preset value is set to be 3% of the maximum power supply capacity of the main power supply. However, it is understood these preset values are not necessarily limited to the above-mentioned values in actual implementation of the present invention.

In practical implementation of the present invention, for example, the primary power-supply unit 210 can be a transformer and the main power supply can be an alternating current (AC) convertible by the transformer into a direct current (DC); the secondary power-supply unit 220 can be a battery or an uninterrupted power supply system and the auxiliary power supply can be a DC power supply output by the battery or the uninterrupted power supply system; the first switch 250 and the second switch 260 can be MOSFET devices; the load sensing unit 212 can be a loading sensor; the control unit 230 can be an embedded controller chip; the overcurrent protection unit 222 can be an overcurrent protection circuit (OPC IC); and the power unit 240 can be a power integrated circuit (power IC).

Figure 3:
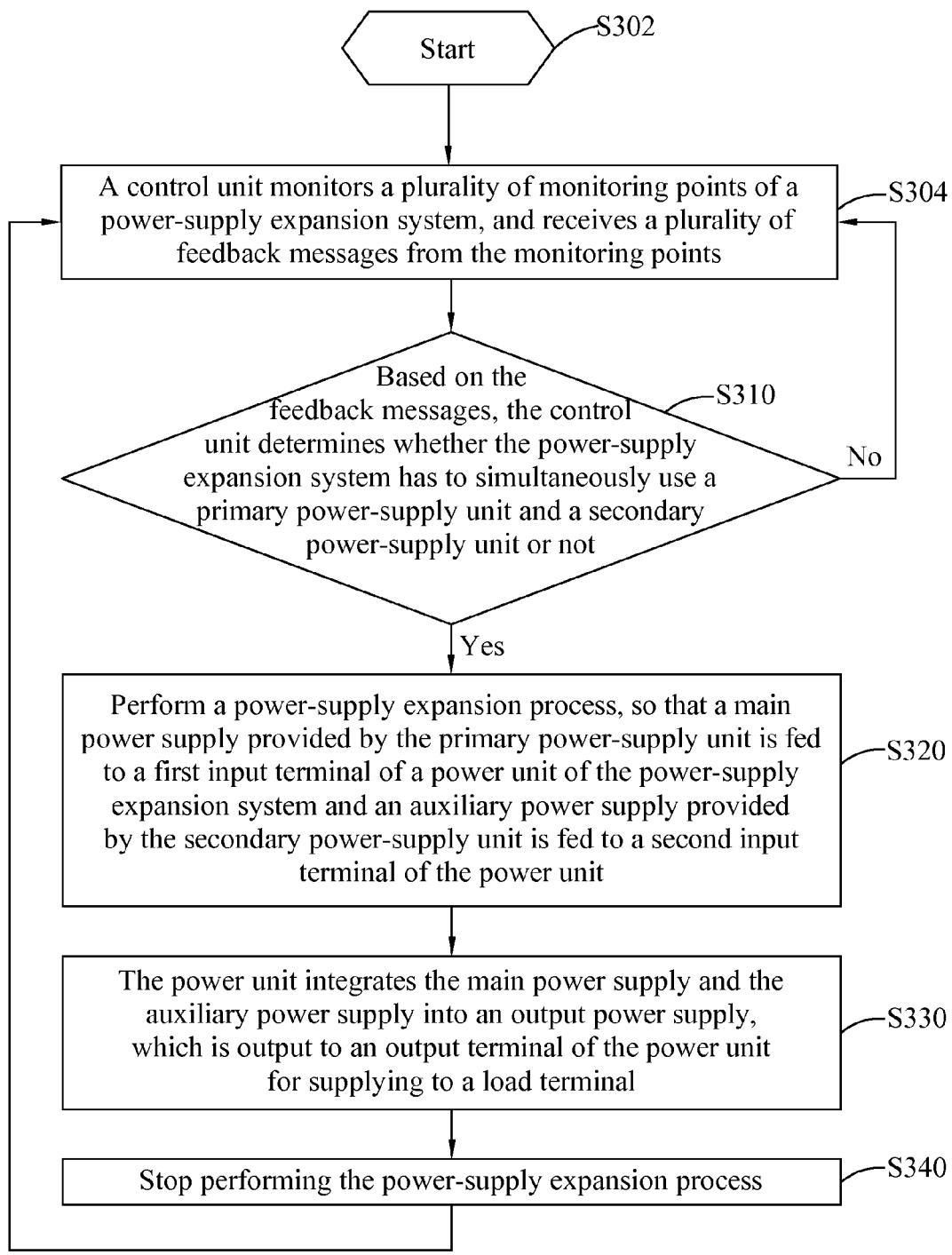
FIG. 3 is a flowchart showing the steps included in a power-supply expansion method according to the present invention.

Please refer to FIGS. 2 and 3 at the same time. FIG. 3 is a flowchart showing the steps included in a power-supply expansion method according to the present invention. As shown, the power-supply expansion method of the present invention is applicable to a power-supply expansion system, such as the power-supply expansion system 200 shown in FIG. 2.

In a step S302, the power-supply expansion method according to the present invention starts.

In a step S304, a control unit 230 observes a plurality of monitoring points in the power-supply expansion system 200 and receives feedback message from each of the monitoring points.

In a step S310, based on the feedback messages, the control unit 230 determines whether the power-supply expansion system 200 has to use a primary power-supply unit 210 and a secondary power-supply unit 220 at the same time. If yes, go to a next step S320; or if no, return to the step S304.

In the step S320, a power-supply expansion process is performed, so that a main power supply provided by the primary power-supply unit 210 is fed to a first input terminal 242 of a power unit 240 of the power-supply expansion system 200, and an auxiliary power supply provided by the secondary power-supply unit 220 is fed to a second input terminal 244 of the power unit 240.

In a step S330, the power unit 240 integrates the main power supply and the auxiliary power supply into an output power supply, which is output to an output terminal 246 of the power unit 240 for supplying to a load terminal 280.

And, in a step S340, the power-supply expansion process is stopped and the step S304 is repeated.

The power-supply expansion method according to the present invention can further include the steps of selectively turning on or cutting off a first switch 250, which is provided between the control unit 230 and the first input terminal 242, according to a switch control signal generated by the control unit 230; and selectively turning on or cutting off a second switch 260, which is provided between the control unit 230 and the second input terminal 244, according to the switch control signal generated by the control unit 230.

In a first embodiment of the power-supply expansion method according to the present invention, one of the monitoring points is a load sensing unit 212 provided in the power-supply expansion system 200 between the primary power-supply unit 210 and the first input terminal 242, and the load sensing unit 212 will send a load value of the primary power-supply unit 210 to the control unit 230 as the feedback message from this monitoring point. Thus, in the first embodiment of the power-supply expansion method, the control unit 230 determines, based on the load value and a first preset value, whether it is necessary to perform the power-supply expansion process. The first preset value is set as a basis on which it can be determined whether to actuate the power-supply expansion process or not. Here, the first preset value can be, but not limited to, 90% of a maximum power supply capacity of the primary power-supply unit 210.

Another one of the monitoring points is the secondary power-supply unit 220, and the feedback message from this monitoring point is an available power supply capacity of the secondary power-supply unit 220. Thus, in the first embodiment of the power-supply expansion method, the control unit 230 can further check for the available power supply capacity of the secondary power-supply unit 220, so that the power-supply expansion process is performed only when the control unit 230 determines the load value has reached the first preset value and the available power supply capacity of the secondary power-supply unit 220 is higher than a preset available power supply capacity. Here, the preset available power supply capacity can be, but not limited to, 20% of a maximum power supply capacity of the secondary power-supply unit 220.

Based on the above arrangements, the operation of different parts of the power-supply expansion system 200 in implementing the power-supply expansion method is described in details as below. When the control unit 230 verifies the load value has reached the first preset value and confirms via a bus, which can be but not limited to a system management bus (SM bus), that the secondary power-supply unit 220 has an available power supply capacity higher than 20% of its maximum power supply capacity, the control unit 230 would work and generate a switch control signal to cut off the first switch 250 and at the same time turn on the second switch 260 for the secondary power-supply unit 220 to feed the auxiliary power supply to the second input terminal 244; and then, the power unit 240 converts the auxiliary power supply to a required specification and supplies the converted auxiliary power to the load terminal 280 via the output terminal 246. At this point, the power unit 240 supplies power to the load terminal 280 from both of the primary and the secondary power-supply unit 210, 220.

In a second embodiment of the power-supply expansion method according to the present invention, when the power-supply expansion process continues and the available power supply capacity of the secondary power-supply unit 220 becomes lower than the preset available power supply capacity, which is smaller than 20% of the maximum power supply of the secondary power-supply unit 220 in this embodiment, the control unit 230 would request an operating system at the load terminal 280 to enter a low power consumption state under a silent mode. In the silent mode, a central processing unit can stably operate at low voltage, low clock pulse, and low noise state. Through the frequency reduction or voltage reduction executed by the central processing unit, the load terminal 280 can have a reduced overall load. Meanwhile, the control unit 230 generates a switch control signal to cut off the second switch 260 and at the same time turn on the first switch 250, and, via the SM bus, controls the secondary power-supply unit 220 to stop supplying power. Further, the control unit 230 stops requesting for the power-supply expansion process when the preset available power supply capacity does not reach 20% of the maximum power supply capacity of the secondary power-supply unit 220.

In a third embodiment of the power-supply expansion method according to the present invention, the control unit 230 determines, based on the load value and a second preset value, whether it is necessary to stop performing the power-supply expansion process. The second preset value can be, but not limited to, 70% of the maximum power supply capacity of the primary power-supply unit 210. With the second preset value, when the load value of the primary power-supply unit 210 supplying power to the load terminal 280 does not reach a level that requires the power-supply expansion process, the performing of the power-supply expansion process is stopped, accordingly.

More specifically, when the power-supply expansion process continues and the load sensing unit 212 detects that the load value of the primary power-supply unit 210 has become smaller than the second preset value for a certain time-duration, the control unit 230 would control the secondary power-supply unit 220 via the SM bus, so that the secondary power-supply unit 220 stops supplying power. And, the control unit 230 cuts off the second switch 260 and turns on the first switch 250 when the secondary power-supply unit 220 stops supplying power. That is, the power-supply expansion system 200 is switched to a power supply mode in which the primary power-supply unit 210 provides the main power supply without the need of performing the power-supply expansion process. In this manner, it is able to effectively utilize the power supply.

In a fourth embodiment of the power-supply expansion method of the present invention, the control unit 230 determines, based on the load value and a third preset value, whether it is necessary to stop performing the power-supply expansion process and cause a charging control unit 270 to charge the secondary power-supply unit 220. The third preset value can be, but not limited to, a value ranged between 20% and 50% of the maximum power supply capacity of the primary power-supply unit 210. The purpose of setting the third preset value is, when the system power consumption is in a state that does not require the power-supply expansion process and there is surplus power available for other systems or devices, the surplus power can be effectively used to charge the secondary power-supply unit 220.

More specifically, when the power-supply expansion process continues and the available power supply capacity of the secondary power-supply unit 220 is smaller than 100% while the load sensing unit 212 detects the load value of the primary power-supply unit 210 has become smaller than the third preset value for a certain time-duration, the control unit 230 would generate a second command signal for commanding the charging control unit 270 to charge the secondary power-supply unit 220. The charging control unit 270 is electrically connected to between the primary power-supply unit 210, the secondary power-supply expansion unit 220 and the control unit 230. Alternatively, it is also possible for the charging control unit 270 to automatically determine whether to charge the secondary power-supply unit 220 or not.

When the secondary power-supply unit 220 is being charged and the load value of the primary power-supply unit 210 is instantaneously increased or becomes highly unstable, the control unit 230 can enable a forced interruption of charging or keep the power-supply expansion system in a charge-interrupted state. When the secondary power-supply unit 220 has been charged to its maximum power supply capacity, the secondary power-supply unit 220 can inform this condition to the control unit 230 via the SM bus, so that the control unit 230 stops charging the secondary power-supply unit 220. Alternatively, it is also possible for the charging control unit 270 to automatically determine whether to stop charging the secondary power-supply unit 220 or not.

In a fifth embodiment of the power-supply expansion method of the present invention, the control unit 230 determines, based on the load value and a fourth preset value, whether it is necessary to stop performing the power-supply expansion process and allow the secondary power-supply unit 220 to supply the power alone. The purpose of setting the fourth preset value is, when the primary power-supply unit 210 fails to supply the power due to any external factor, the power-supply expansion system 200 can be switched to the secondary power-supply unit 220 for the same to supply the power. In the fifth embodiment, the fourth preset value can be, but not limited to, 3% of the maximum power supply capacity of the primary power-supply unit 210.

When the power-supply expansion process continues and the control unit 230 determines the load value is smaller than the fourth preset value and the secondary power-supply unit 220 has an available power supply capacity larger than 20%, the control unit 230 is able to force the load terminal 280 into a silent mode, so that the central processing unit executes frequency reduction or voltage reduction. Thereafter, when the load terminal 280 has entered into a low power consumption state under the silent mode, the control unit 230 generates a switch control signal to cut off the second switch 260 and turn on the first switch 250, and the power-supply expansion system is switched to a power supply mode in which the secondary power-supply unit 220 provides the auxiliary power supply via the first switch 250.

Figure 4:
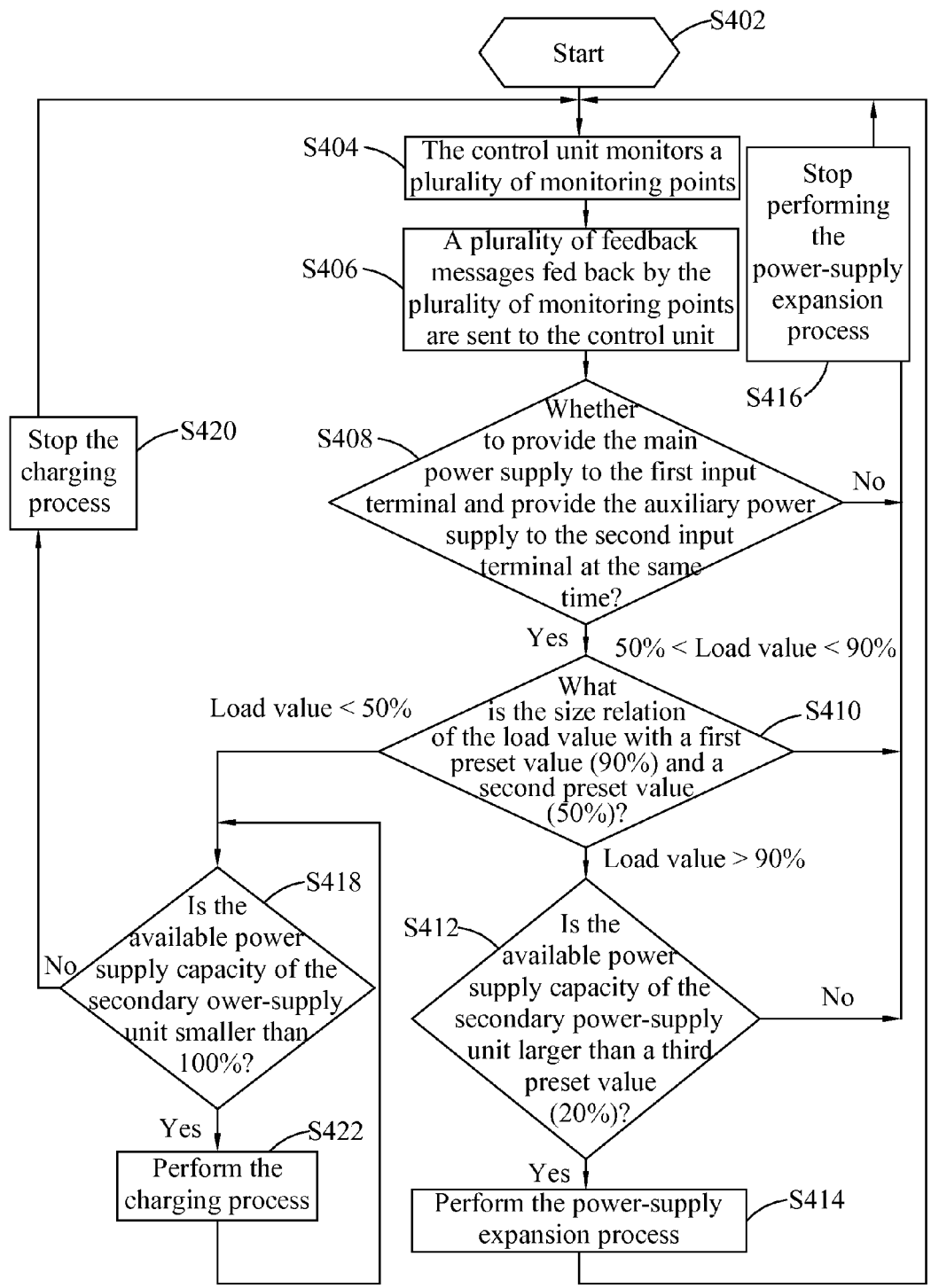
FIG. 4 is another flowchart showing the steps included in the power-supply expansion method according to the present invention.

Please refer to FIG. 4 that is another flowchart showing the steps included in the power-supply expansion method of the present invention. First, in a step S402, the power-supply expansion method of the present invention starts. Then, in a step S404, the control unit 230 observes a plurality of monitoring points in the power-supply expansion system 200. In a step S404, a plurality of feedback messages fed back by the plurality of monitoring points is sent to the control unit 230. In Step 406, the plurality of feedback messages is provided to the control unit 230. The monitoring points are separately located between the control unit 230 and the load sensing unit 212, the secondary power-supply unit 220, the first switch 250, the second switch 260, and the charging control unit 270.

Then, in a step S408, the control unit 230 determines, according to at least one of the load values fed back by the monitoring points being observed, whether to simultaneously provide the main power supply to the first input terminal 242 and the auxiliary power supply to the second input terminal 244. If not, go to a step S416 and stop performing the power-supply expansion process; and if yes, go to a step S410 and determine a size relation of the load value with the first preset value of 90% and the second preset value of 50%. If the load value has become larger than the first preset value of 90% for a preset time-duration, such as 2 seconds, go to a step S412 and determine whether the available power supply capacity of the secondary power-supply unit 220 is larger than the third preset value of 20%. If yes, go to a step S414 and perform the power-supply expansion process; and if not, go to the step S416 and stop performing the power-supply expansion process.

Further, when the load value has become larger than the second preset value of 50% but smaller than the first preset value of 90% for a preset time-duration, such as 2 seconds, go to the step S416 and stop performing the power-supply expansion process.

Furthermore, when the load value has become smaller than the second preset value of 50% for a preset time-duration, such as 2 seconds, go to a step S418 and determine whether the available power supply capacity of the secondary power-supply unit 220 is smaller than 100%. If yes, go to a step S422 and charge the secondary power-supply unit 220; or if not, go to a step S420 and stop charging the secondary power-supply unit 220.

In conclusion, the present invention uses the control unit 230 to determine the timing for the primary power-supply unit 210 and the secondary power-supply unit 220 to provide the main power supply and the auxiliary power supply, respectively, to the power unit 240, and the timing for charging the secondary power-supply unit 220, so that the power supplied by the primary and the secondary power-supply unit 210, 220 can be best utilized.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A power-supply expansion system comprising:
a primary power-supply unit providing a main power supply;
a secondary power-supply unit providing an auxiliary power supply;
a power unit comprising a first input terminal, a second input terminal, and an output terminal; the first input terminal receiving the main power supply or the auxiliary power supply, the second input terminal receiving the auxiliary power supply, the power unit integrating the main power supply and the auxiliary power supply into an output power supply, and the output power supply fed to a load terminal via the output terminal; and
a control unit being connected to the primary power-supply unit and the secondary power-supply unit; and the control unit, based on a load value of the primary power-supply unit, selectively performing a power-supply expansion process so as to feed the auxiliary power supply to the second input terminal by the secondary power-supply unit;
an overcurrent protection unit electrically connected to the secondary power-supply unit; and the overcurrent protection unit limiting the auxiliary power supply provided by the secondary power-supply unit to a value not exceeding a nominal current value;
a first switch being located between the overcurrent protection unit and the first input terminal, and being selectively turned on or turn off according to a switch control signal output by the control unit; and
a second switch being located between the overcurrent protection unit and the second input terminal, and being selectively turned on or turn off according to the switch control signal output by the control unit;
wherein when the control unit determines the load value reaches a first preset value, the control unit turns off the first switch and turns on the second switch to perform the power-supply expansion process;
wherein when the control unit determines the load value is smaller than a second preset value in a preset time span, the control unit turns off the second switch and turns on the first switch to stop performing the power-supply expansion process;
wherein the power-supply expansion system further comprises a charging control unit being electrically connected to the primary power-supply unit, the secondary power-supply unit and the control unit, and when the control unit determines the load value is smaller than a third preset value in the preset time span, the charging control unit controlled by a second control signal generated by the control unit to perform a charge action to the secondary power-supply unit;
wherein when the control unit determines the load value is smaller than a fourth preset value, the control unit stops performing the power-supply expansion process and supplies the auxiliary power supply via the first switch by the control unit.

2. The power-supply expansion system as claimed in claim 1, further comprising a load sensing unit electrically connected to the primary power-supply unit for sensing the load value of the primary power-supply unit.

3. The power-supply expansion system as claimed in claim 1, wherein the secondary power-supply unit is a battery.

4. A power-supply expansion method applicable to a power-supply expansion system, comprising the following steps:
monitoring a plurality of feedback messages fed back from a plurality of monitoring points of the power-supply expansion system by a control unit;
determining, based on the monitored feedback messages, whether the power-supply expansion system has to simultaneously provide a main power supply to a first input terminal and an auxiliary power supply to a second input terminal by the control unit;
performing a power-supply expansion process for feeding the main power supply to the first input terminal and feeding the auxiliary power to the second input terminal, if the power-supply expansion system has to simultaneously provide a main power supply to a first input terminal and an auxiliary power supply to a second input terminal by the control unit; and
integrating the main power supply and the auxiliary power supply into an output power supply and outputting the output power supply to an output terminal;
selectively turning on or turning off a first switch according to a switch control signal output by the control unit and selectively turning on or turning off a second switch according to the switch control signal output by the control unit;
wherein the main power supply is provided by a primary power-supply unit, and the feedback messages include at least a load value of the primary power-supply unit; and the method further comprising the step of turning off the first switch and turning on the second switch to perform the power-supply expansion process when the control unit determines the load value reaches a first preset value;
wherein when the control unit determines the load value is smaller than a second preset value in a preset time span, the control unit turns off the second switch and turns on the first switch to stop performing the power-supply expansion process;
wherein when the control unit determines the load value is smaller than a third preset value in the preset time span, the control unit generates a second control signal for controlling a charging control unit to perform a charging process; and wherein when the control unit determines the load value is smaller than a fourth preset value, the control unit stops performing the power-supply expansion process and supplies the auxiliary power supply via the first switch by the control unit.

5. The power-supply expansion method as claimed in claim 4, wherein the first preset value is 90% of a maximum power supply capacity of the main power supply.

6. The power-supply expansion method as claimed in claim 5, further comprising the step of performing the power-supply expansion process when the control unit determines an available power supply capacity of a secondary power-supply unit providing the auxiliary power supply is larger than a preset available power supply capacity.

7. The power-supply expansion method as claimed in claim 6, wherein the preset available power supply capacity is 20% of a maximum power supply capacity of the secondary power-supply unit.

8. The power-supply expansion method as claimed in claim 4, wherein, when the control unit determines an available power supply capacity of a secondary power-supply unit providing the auxiliary power supply is smaller than a preset available power supply capacity, the second switch is turned off, the first switch is turned on, and the power-supply expansion process is stopped by the control unit.

9. The power-supply expansion method as claimed in claim 8, wherein the preset available power supply capacity is 20% of a maximum power supply capacity of the secondary power-supply unit.

10. The power-supply expansion method as claimed in claim 9, further comprising the step of generating a first control signal by the control unit for controlling a system to execute frequency reduction.

11. The power-supply expansion method as claimed in claim 4, wherein the second preset value is 70% of a maximum power supply capacity of the main power supply.

12. The power-supply expansion method as claimed in claim 4, wherein the third preset value is ranged from 20% to 50% of a maximum power supply capacity of the main power supply.

13. The power-supply expansion method as claimed in claim 4, wherein the fourth preset value is 3% of a maximum power supply capacity of the main power supply.

* * * * *